(12) United States Patent
Hirao (10) Patent No.: US 9,719,563 B2
(45) Date of Patent: Aug. 1, 2017

(54) AXLE ASSEMBLY HAVING A TAPERED SPLINE ARRANGEMENT

(71) Applicant: ArvinMeritor Technology, LLC, Troy, MI (US)

(72) Inventor: Wagner Hirao, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 244 days.

(21) Appl. No.: 14/719,977

(22) Filed: May 22, 2015

(65) Prior Publication Data

US 2016/0341260 A1 Nov. 24, 2016

(51) Int. Cl.
| | |
|---|---|
| *F16H 48/24* | (2006.01) |
| *F16D 11/14* | (2006.01) |
| *F16D 23/00* | (2006.01) |
| *B60K 17/36* | (2006.01) |
| *F16C 3/02* | (2006.01) |
| *F16D 11/00* | (2006.01) |
| *F16D 1/10* | (2006.01) |
| *F16H 48/08* | (2006.01) |

(52) U.S. Cl.
CPC .............. *F16D 23/00* (2013.01); *B60K 17/36* (2013.01); *F16C 3/02* (2013.01); *F16D 11/14* (2013.01); *F16H 48/24* (2013.01); *F16D 2001/103* (2013.01); *F16D 2011/006* (2013.01); *F16D 2011/008* (2013.01); *F16H 48/08* (2013.01)

(58) Field of Classification Search
CPC .............. F16D 11/14; F16D 2011/008; F16D 2001/103; F16H 48/24
See application file for complete search history.

(56) References Cited

U.S. PATENT DOCUMENTS

| | | | |
|---|---|---|---|
| 3,249,188 A | * | 5/1966 | Maina .................... F16D 11/10 192/108 |
| 4,452,331 A | | 6/1984 | Lunn et al. |
| 5,370,018 A | | 12/1994 | Kwasniewski |
| 6,581,745 B2 | | 6/2003 | Kanazawa |
| 7,749,124 B2 | | 7/2010 | Nakajima |
| 2012/0024652 A1 | | 2/2012 | Ishii et al. |
| 2014/0190781 A1 | | 7/2014 | Lawson et al. |

FOREIGN PATENT DOCUMENTS

| | | | |
|---|---|---|---|
| DE | 2314374 A1 | 9/1974 | |
| EP | 0 598 234 A1 | 5/1994 | |
| GB | 1 493 551 A | 11/1977 | |
| GB | 1493551 A | * 11/1977 | ........... B60K 17/346 |
| WO | 2004009392 A1 | 1/2004 | |

OTHER PUBLICATIONS

European Patent Office, Extended European Search Report for the corresponding European Patent Application No. 16157309.2 dated Jan. 30, 2017.
European Patent Office, partial European Search Report for the corresponding European Patent Application No. 16157309.2 dated Oct. 4, 2016.

* cited by examiner

*Primary Examiner* — Huan Le
(74) *Attorney, Agent, or Firm* — Brooks Kushman P.C.

(57) ABSTRACT

An axle assembly having a tapered spline arrangement. The axle assembly may include a first shaft that may have a first spline and a clutch collar that may have a clutch collar spline that may be disposed in a hole that may receive the first shaft. The first spline and the second spline may be tapered in opposite directions.

19 Claims, 7 Drawing Sheets

AXLE ASSEMBLY HAVING A TAPERED SPLINE ARRANGEMENT

TECHNICAL FIELD

This disclosure relates to an axle assembly having a tapered spline arrangement.

BACKGROUND

A vehicle axle having a splined input shaft is disclosed in U.S. Pat. No. 4,452,331.

SUMMARY

In at least one embodiment, an axle assembly is provided. The axle assembly may include a first shaft and a clutch collar. The first shaft may extend along an axis and may have a first spline. The first spline may have a first spline tooth that may be tapered in a first direction that may extend substantially parallel to the axis. The clutch collar may be movably disposed on the first shaft. The clutch collar may have a hole and a clutch collar spline. The hole may receive the first shaft. The clutch collar spline may be disposed in the hole. The clutch collar spline may have a clutch collar spline tooth that may be tapered in a second direction that may extend opposite the first direction.

In at least one embodiment, an axle assembly is provided. The axle assembly may include a first shaft and a clutch collar. The first shaft may extend along an axis and may have a first spline. The first spline may include a first set of spline teeth that may be arranged around the axis. Each member of the first set of spline teeth may include a first end surface, a second end surface, a first side surface, and a second side surface. The first end surface may extend away from the axis. The second end surface may extend away from the axis and may be disposed opposite the first end surface. The first side surface may extend from the first end surface to the second end surface. The second side surface may be disposed opposite the first side surface and may also extend from the first end surface to the second end surface. The second side surface may be disposed in a nonparallel relationship with the first side surface. A length of the first end surface from the first side surface to the second side surface may be greater than a length of the second end surface from the first side surface to the second side surface. The clutch collar may be movably disposed on the first shaft. The clutch collar may have a hole through which the first shaft may extend. The clutch collar may also have a set of clutch collar spline teeth that may receive the first set of spline teeth.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
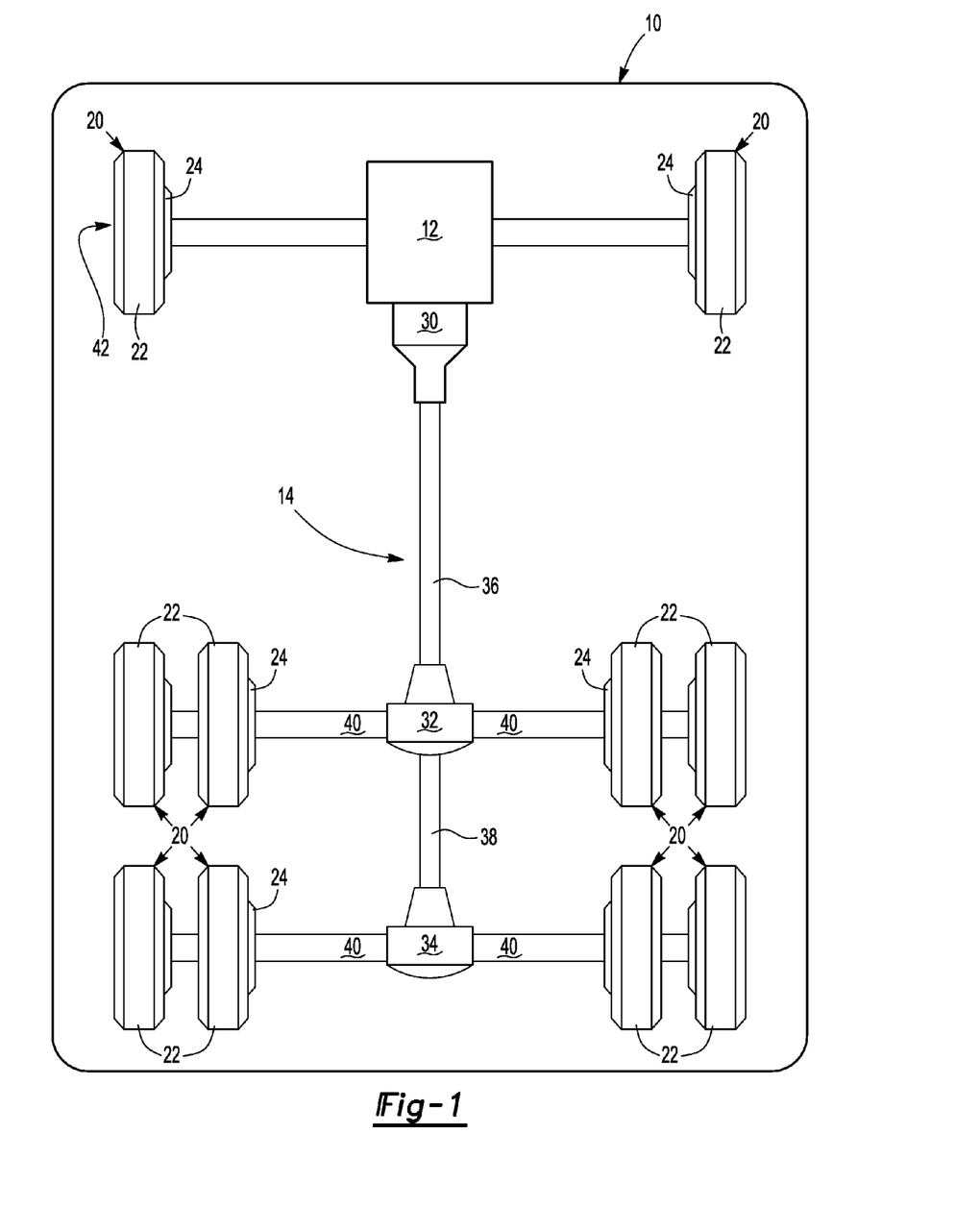
FIG. 1 is a schematic of an exemplary vehicle having an axle assembly.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels. The vehicle 10 may include one or more power sources 12 and a drivetrain 14.

The power source 12 may provide power that may be used to rotate one or more traction wheels. In FIG. 1, a single power source 12 is shown that may be configured as an internal combustion engine that may be adapted to use or combust any suitable type of fuel, such as gasoline, diesel fuel, or hydrogen. Alternatively, multiple or different power sources may be provided, such as may be employed with a hybrid vehicle or electric vehicle. In such embodiments, a power source could be an electric power source, such as a battery, capacitor, or fuel cell, or a non-electric power source, such as a hydraulic power source.

The drivetrain 14 may be driven or powered by one or more power sources 12 and may provide torque to one or more fraction wheel assemblies 20 that may include a tire 22 mounted on a wheel 24. The drivetrain 14 may include a transmission 30 and one or more axle assemblies. In FIG. 1, a tandem axle configuration is shown that includes a first axle assembly 32 and a second axle assembly 34. The first axle assembly 32 may be referred to as a forward-rear axle assembly. The second axle assembly 34 may be referred to as a rear-rear axle assembly. Optionally, additional axle assemblies may be provided that may be coupled together in series.

Torque may be transmitted through the drivetrain 14 in the following manner. The power source 12 may be operatively coupled to the input of the transmission 30. An output of the transmission 30 may be coupled to an input of the first axle assembly 32, such as with a drive shaft 36. An output of the first axle assembly 32 may be selectively coupled to an input of the second axle assembly 34 via a prop shaft 38.

The first axle assembly 32 and the second axle assembly 34 may each have a plurality of outputs that may be coupled to one or more wheel assemblies 20. In the embodiment shown, the first axle assembly 32 and the second axle assembly 34 each have a pair of outputs. Each output may be selectively or non-selectively coupled to a corresponding axle 40 or half-shaft upon which one or more wheel assemblies 20 may be disposed.

The vehicle 10 may also include a front axle assembly 42 that may be configured to steer the vehicle 10. The front axle assembly 42 may or may not be configured as a drive axle that may provide torque to at least one associated wheel assembly 20.

Figure 2:
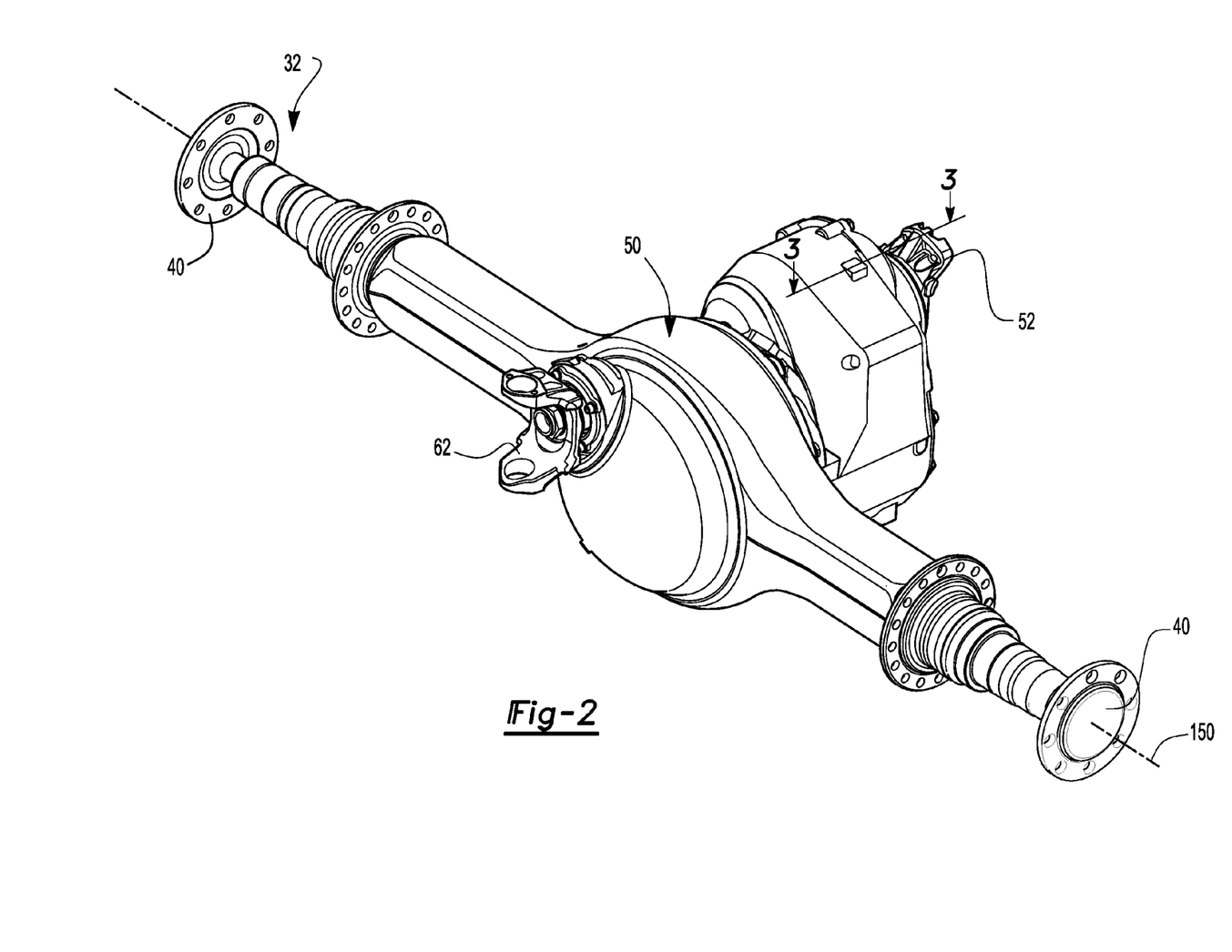
FIG. 2 is a perspective view of the axle assembly.
Figure 3:
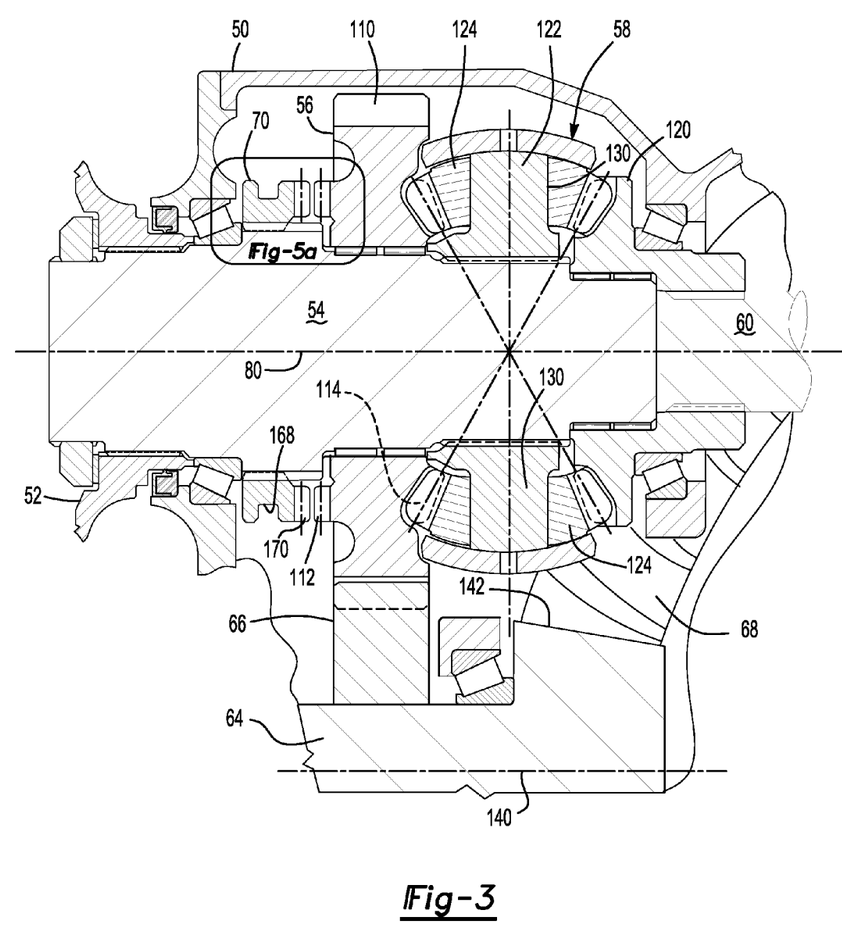
FIG. 3 is a section view of a portion of the axle assembly along section line 3-3.

Referring to FIGS. 2 and 3, an exemplary first axle assembly 32 is shown. The first axle assembly 32 may provide torque to its associated wheel assemblies 20 and may provide torque to the second axle assembly 34. In at least one embodiment, the first axle assembly 32 may include a housing 50, an input yoke 52, an input shaft 54, a drive gear 56, an interaxle differential unit 58, an output shaft 60, an output yoke 62, a pinion 64, a driven gear 66, a ring gear 68, and a clutch collar 70. These components are shown to facilitate an abbreviated discussion of the operation of the first axle assembly 32.

The housing 50 may receive various components of the first axle assembly 32. In addition, the housing 50 may facilitate mounting of the first axle assembly 32 to the vehicle 10.

The input yoke 52 may facilitate coupling of the first axle assembly 32 to a torque source. For example, the input yoke 52 may be coupled to the drive shaft 36. Alternatively, the input yoke 52 may be coupled to a connection shaft or prop shaft that may be coupled to an output yoke of another axle assembly or a transfer case. The input yoke 52 may be disposed on the input shaft 54.

Figure 4:
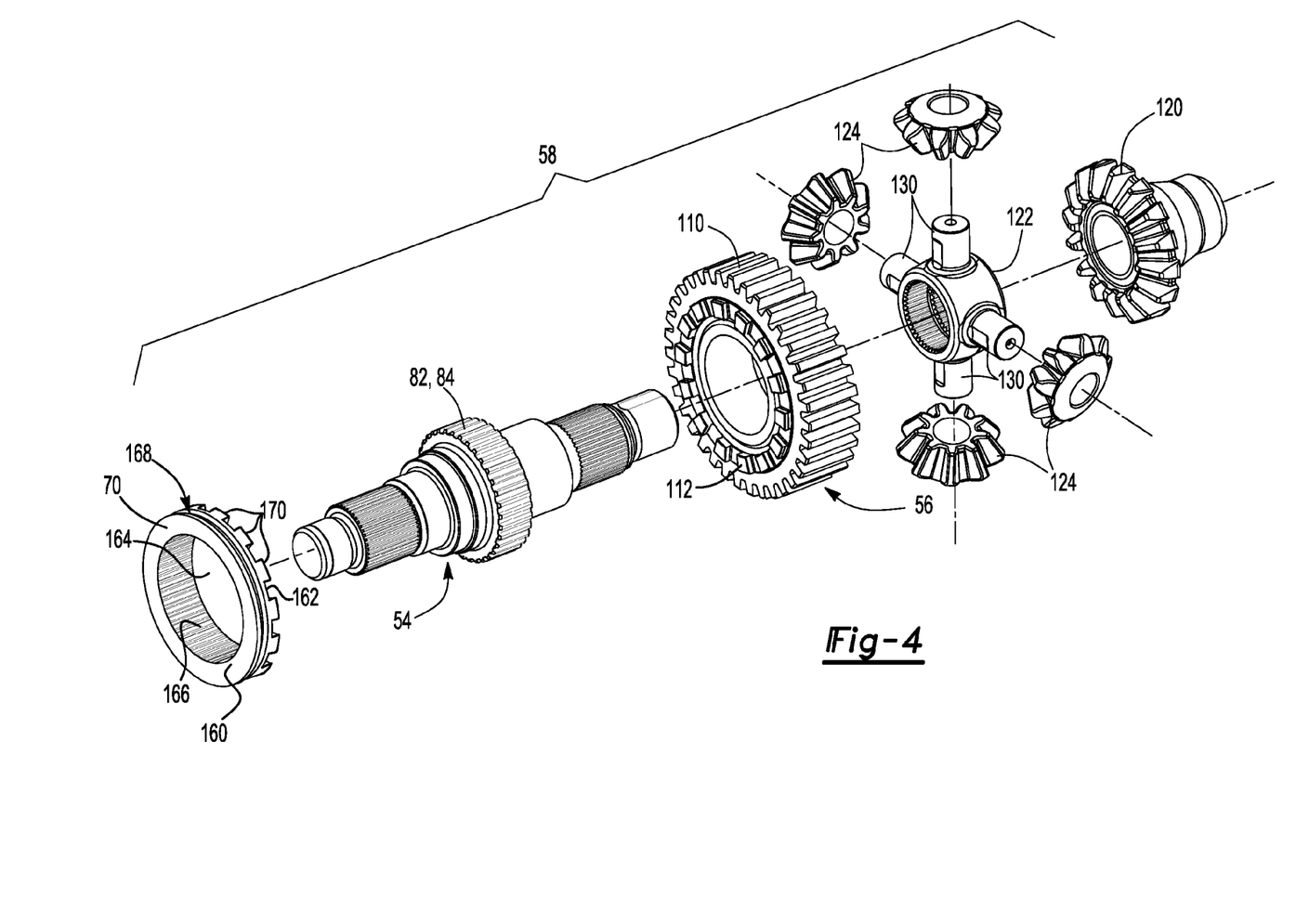
FIG. 4 is an exploded view of a portion of the axle assembly including a shaft, a clutch collar, and an interaxle differential unit.
Figure 5A:
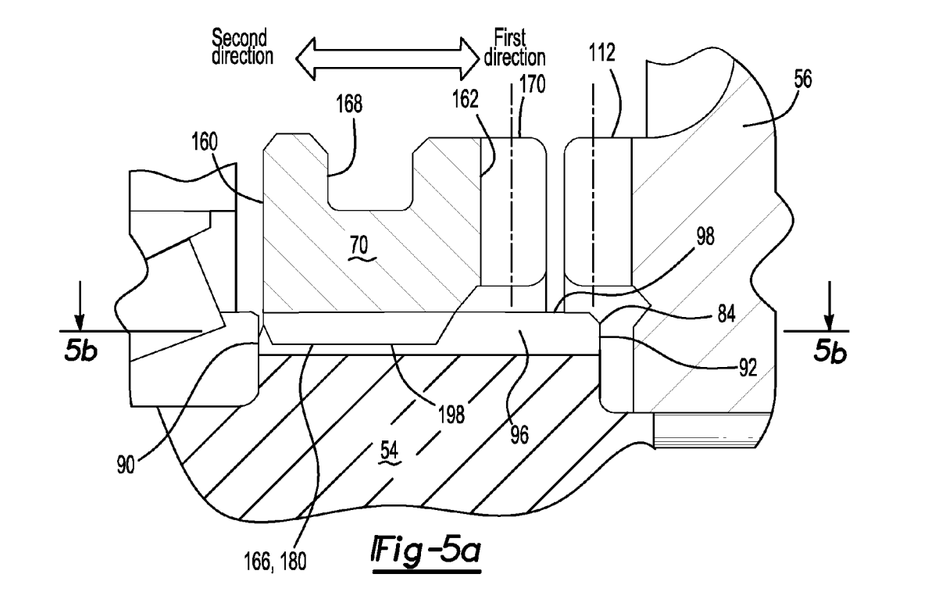
FIG. 5a is a magnified view of a portion of the axle assembly shown in FIG. 4 with the clutch collar in an exemplary disengaged position.
Figure 5B:
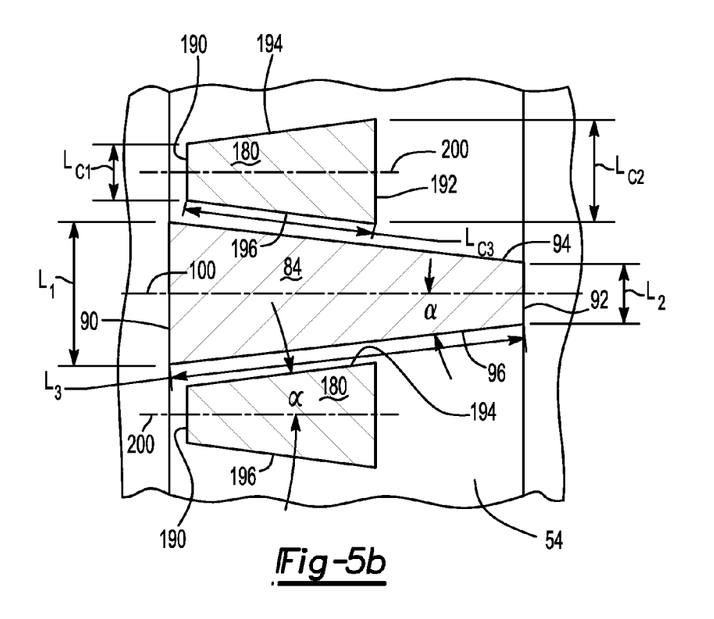
FIG. 5b is a section view along section line 5b-5b.

The input shaft 54 may extend along and may be configured to rotate about an axis 80. For example, the input shaft 54 may be rotatably supported by one or more roller bearings that may be disposed on the housing 50. The input shaft 54 may be operatively connected to the interaxle differential unit 58, which may be provided when the first axle assembly 32 provides torque to another axle assembly. As is best shown in FIGS. 4, 5a, and 5b, the input shaft 54 may include a first spline 82.

The first spline 82 may include a first set of spline teeth 84 that may be arranged around the axis 80. The spline teeth 84 may primarily extend in an axial direction or in same direction as the axis 80. The spline teeth 84 may be spaced apart from each other such that a gap is provided between adjacent spline teeth 84. The gap may receive a spline tooth on the clutch collar 70 as will be discussed in more detail below. As is best shown in FIGS. 5a and 5b, each spline tooth 84 may be tapered (e.g., may become narrower or may reduce in thickness) in a first direction, such as in a direction that may extend along or substantially parallel to the axis 80. In FIGS. 5a and 5b, the first direction is to the right from the perspective shown. Each member of the first set of spline teeth 84 may include a first end surface 90, a second end surface 92, a first side surface 94, a second side surface 96, and an outer surface 98.

The first end surface 90 may be disposed proximate an end of the spline tooth 84. The first end surface 90 may extend away from the axis 80. In addition, the first end surface 90 may be disposed substantially perpendicular to the axis 80 and may be disposed substantially parallel to the second end surface 92 in one or more embodiments. As is best shown in FIG. 5b, the first end surface 90 may have a length $L_1$ that may extend from the first side surface 94 to the second side surface 96. The length $L_1$ may be measured in a plane that may extend through the spline tooth 84 from the first side surface 94 to the second side surface 96 and that may be disposed substantially perpendicular to a center tooth plane 100, which will be discussed in more detail below. The plane may be a cross sectional plane or may be disposed proximate the outer surface 98.

The second end surface 92 may be disposed proximate an end of the spline tooth 84 and may be disposed opposite the first end surface 90. The second end surface 92 may extend away from the axis 80. In addition, the second end surface 92 may be disposed substantially perpendicular to the axis 80 in one or more embodiments. As is best shown in FIG. 5b, the second end surface 92 may have a length $L_2$ that may extend from the first side surface 94 to the second side surface 96. The length $L_2$ may be measured in a plane that may be disposed substantially perpendicular to the center tooth plane 100 as previously discussed. As is best shown in FIG. 5b, the length $L_1$ of the first end surface 90 may be greater than the length $L_2$ of the second end surface 92.

The first side surface 94 may extend from the first end surface 90 to the second end surface 92. In addition, the first side surface 94 may be disposed in a nonparallel relationship with the axis 80 and the center tooth plane 100. As is best shown in FIG. 5b, the first side surface 94 may have a length $L_3$ that may extend from the first end surface 90 to the second end surface 92. The length $L_1$ of the first end surface 90 and the length $L_2$ of the second end surface 92 may be less than the length $L_3$ of the first side surface 94.

The second side surface 96 may be disposed opposite the first side surface 94 and may extend from the first end surface 90 to the second end surface 92. Like the first side surface 94, the second side surface 96 may be disposed in a nonparallel relationship with the axis 80 and the center tooth plane 100. In addition, the second side surface 96 may be disposed in a nonparallel relationship with the first side surface 94. The second side surface 96 may have the same length as the first side surface 94.

The outer surface 98 may face away from the axis 80. The outer surface 98 may extend from the first end surface 90 to the second end surface 92. In addition, the outer surface 98 may extend from the first side surface 94 to the second side surface 96.

Each spline tooth 84 may be bisected by a corresponding center tooth plane 100. As is best shown in FIG. 5b, the center tooth plane 100 may bisect the first end surface 90 and the second end surface 92. In addition, the center tooth plane 100 may extend along the axis 80 and the axis 80 may be completely disposed in the center tooth plane 100. The first side surface 94 and the second side surface 96 may be disposed closer to the center tooth plane 100 at the second end surface 92 than at the first end surface 90. Furthermore, the first side surface 94 and the second side surface 96 may be disposed at an angle α with respect to the center tooth plane 100. As such, the first side surface 94 and the second side surface 96 may be disposed in a nonparallel relationship with the center tooth plane 100.

Referring to FIGS. 3 and 4, the drive gear 56 may be disposed proximate the input shaft 54. In at least one embodiment, the drive gear 56 may have a center bore that may receive a bearing that may be disposed on the input shaft 54 and that may rotatably support the drive gear 56. The bearing, if provided, may allow the drive gear 56 to rotate about or with respect to the input shaft 54 under certain operating conditions. The drive gear 56 may include an outer gear 110, a face gear 112, and an internal gear 114.

The outer gear 110 may include a plurality of teeth that may engage and may mesh with teeth on the driven gear 66. For example, the teeth may be arranged around an outside diameter of the drive gear 56.

The face gear 112 may include a set of teeth that may be arranged on a side or face of the drive gear 56 that may face away from the interaxle differential unit 58 and toward the clutch collar 70. The teeth of the face gear 112 may selectively engage teeth on the clutch collar 70 as will be discussed in more detail below. The teeth of the face gear 112 may be provided without a negative pressure angle due to the tapered spline arrangement between the input shaft 54 and the clutch collar 70 as will be discussed in more detail below.

The internal gear 114 may be disposed on an opposite side of the drive gear 56 from the face gear 112. The internal gear 114 may include a set of teeth that may be arranged on a side or face of the drive gear 56 that faces toward the interaxle differential unit 58.

The interaxle differential unit 58 may compensate for speed differences between different drive axle assemblies, such as speed differences between the first axle assembly 32 and the second axle assembly 34. The interaxle differential unit 58 may be provided in various locations. In FIG. 3, the interaxle differential unit 58 is disposed on the input shaft 54 adjacent to the drive gear 56; however, it is contemplated that the interaxle differential unit 58 may be provided in other locations, such as closer to the output yoke 62, and that the interaxle differential unit 58 may be disposed on a shaft other than the input shaft 54.

Referring to FIGS. 3 and 4, an exemplary interaxle differential unit configuration is shown that may include an output gear 120, a spider 122, and a plurality of pinion gears 124. It is to be understood that other interaxle differential unit configurations may be provided that may be compatible with the tapered spline arrangements discussed below.

The output gear 120 may be disposed proximate the input shaft 54. For example, the output gear 120 may extend along the axis 80 and may have a center bore that may receive and/or support an end of the input shaft 54. A bearing may be provided in the center bore between the input shaft 54 and output gear 120 to facilitate alignment and rotation. The center bore may also include a spline or splined portion that may be spaced apart from the input shaft 54 and that may receive and engage a corresponding spline on another shaft, such as the output shaft 60. As such, the output gear 120 may not rotate about the axis 80 with respect to the output shaft 60.

The spider 122 may be fixedly disposed on the input shaft 54. For instance, the spider 122 may include a center bore that may include splines that may mate with corresponding splines on the input shaft 54 to help align and secure the spider 122 to the input shaft 54. As such, the spider 122 may rotate about the axis 80 with the input shaft 54. The spider 122 may also include one or more pins 130 that may extend away from the center bore of the spider 122.

The pinion gear 124 may be rotatably disposed on the pin 130. The pinion gear 124 may include teeth that may mate with the internal gear 114 of the drive gear 56 and may mate with teeth on the output gear 120.

Referring to FIG. 3, the output shaft 60 may extend along and may be configured to rotate about the axis 80. For instance, the output shaft 60 may be supported by one or more bearings that may be disposed on the housing 50. The output shaft 60 may be coupled to the interaxle differential unit 58. For example, the output shaft 60 may be fixedly coupled to the output gear 120.

Referring to FIG. 2, the output yoke 62 may facilitate coupling of the first axle assembly 32 to the prop shaft 38. The output yoke 62 may be coupled to the prop shaft 38 in any suitable manner, such as with a universal joint. The output yoke 62 may be fixedly coupled to the output shaft 60.

Referring to FIG. 3, the pinion 64 may be spaced apart from the input shaft 54 and may be configured to rotate about a second axis 140. The pinion 64 may rotate with the driven gear 66. A pinion gear 142 may be disposed at an end of the pinion 64. The pinion gear 142 may be integrally formed with the pinion 64 and may include a set of teeth that mate with corresponding teeth on the ring gear 68.

The driven gear 66 may be disposed proximate the pinion 64. For example, the pinion 64 may be received in a center bore of the driven gear 66 and the driven gear 66 may be fixedly disposed on and may rotate with the pinion 64. The driven gear 66 may include a plurality of teeth that may be generally arranged about an outside diameter of the driven gear 66 that mate with the outer gear 110 of the drive gear 56.

The ring gear 68 may be configured to rotate about a third axis and may be coupled to an axle 40 of the first axle assembly 32. The ring gear 68 may be mounted to or may be operatively connected to a differential unit. The differential unit may be generally disposed inside the ring gear 68 and may be configured to permit the axles 40 to rotate at different speeds. Torque may be transmitted from the ring gear 68 to the differential unit and the differential unit may provide torque to the axles 40. For example, the axles 40 may extend along and may be rotated about an axis, such as the third axis 150 by the differential unit. The third axis 150 is best shown in FIG. 2.

Referring to FIGS. 4, 5a, and 5b, the clutch collar 70, which may also be referred to as a lock collar, may be movably disposed on the input shaft 54. The clutch collar 70 may move axially or move along the axis 80 between a disengaged position and an engaged position as will be discussed in more detail below. The clutch collar 70 may be generally ring-shaped and may include a first clutch collar face 160, a second clutch collar face 162, a hole 164, a second spline 166, and an annular groove 168.

The first clutch collar face 160 may face away from the drive gear 56. The first clutch collar face 160 may be disposed substantially perpendicular to the axis 80 in one or more embodiments.

The second clutch collar face 162 may be disposed opposite the first clutch collar face 160. As such, the second clutch collar face 162 may be disposed between the first clutch collar face 160 and the drive gear 56. The second clutch collar face 162 may be disposed substantially perpendicular to the axis 80 and/or substantially parallel to the first clutch collar face 160 in one or more embodiments. The second clutch collar face 162 may include a clutch collar face gear 170.

The clutch collar face gear 170 may include a set of teeth that may be arranged around the axis 80 on the second clutch collar face 162. The teeth of the clutch collar face gear 170 may be provided without a negative pressure angle due to the tapered spline arrangement between the input shaft 54 and the clutch collar 70. The teeth of the clutch collar face gear 170 may selectively engage the teeth of the face gear 112 of the drive gear 56 depending on the position of the clutch collar 70 as will be discussed in more detail below.

The hole 164 may extend between the first clutch collar face 160 and the second clutch collar face 162. For example, the hole 164 may extend along and may be radially disposed about the axis 80. The hole 164 may receive the input shaft 54.

The second spline 166 may include a second set of spline teeth, which may be referred to as a set of clutch collar spline teeth 180. The set of clutch collar spline teeth 180 may be disposed in the hole 164 and may extend between the first clutch collar face 160 in the second clutch collar face 162. In addition, the clutch collar spline teeth 180 may be arranged around the axis 80 and may extend toward the axis 80. The clutch collar spline teeth 180 may be spaced apart from each other such that a gap is provided between adjacent clutch collar spline teeth 180. As is best shown in FIG. 5b, a spline tooth 84 of the input shaft 54 may be received in the gap between adjacent clutch collar spline teeth 180. Each clutch collar spline tooth 180 may be tapered in a second direction that may extend opposite the first direction. The second direction may extend along or extend substantially parallel to the axis 80 and may extend to the left from the perspective shown in FIG. 5a. As is best shown in FIGS. 5a and 5b, each member of the set of clutch collar spline teeth 180 may include a first clutch collar spline tooth end surface 190, a second clutch collar spline tooth end surface 192, a first clutch collar spline tooth side surface 194, a second clutch collar spline tooth side surface 196, and an outer clutch collar spline tooth surface 198.

The first clutch collar spline tooth end surface 190 may be disposed proximate an end of the clutch collar spline tooth 180. The first clutch collar spline tooth end surface 190 may extend toward the axis 80. The first clutch collar spline tooth end surface 190 or a portion thereof may be disposed substantially perpendicular to the axis 80 and may be disposed substantially parallel to the second clutch collar spline tooth end surface 192 in one or more embodiments. As is best shown in FIG. 5b, the first clutch collar spline tooth end surface 190 may have a length $L_{C1}$ that may extend from the first clutch collar spline tooth side surface 194 to the second clutch collar spline tooth side surface 196. The length $L_{C1}$ may be measured in a plane that may extend through the clutch collar spline tooth 180 from the first clutch collar spline tooth side surface 194 to the second clutch collar spline tooth side surface 196 and that be disposed substantially perpendicular to a clutch collar center tooth plane 200, which will be discussed in more detail below. The plane may be a cross sectional plane or may be disposed proximate the outer clutch collar spline tooth surface 198.

The second clutch collar spline tooth end surface 192 may be disposed proximate an end of the clutch collar spline tooth 180 and may be disposed opposite the first clutch collar spline tooth end surface 190. The second clutch collar spline tooth end surface 192 may extend toward from the axis 80. In addition, the second clutch collar spline tooth end surface 192 or a portion thereof may be disposed substantially perpendicular to the axis 80 in one or more embodiments. As is best shown in FIG. 5b, the second clutch collar spline tooth end surface 192 may have a length $L_{C2}$ that may extend from the first clutch collar spline tooth side surface 194 to the second clutch collar spline tooth side surface 196. The length $L_{C2}$ may be measured in a plane that may be disposed substantially perpendicular to the clutch collar center tooth plane 200. The length $L_{C1}$ of the first clutch collar spline tooth end surface 190 may be less than the length $L_{C2}$ of the second clutch collar spline tooth end surface 192.

The first clutch collar spline tooth side surface 194 may extend from the first clutch collar spline tooth end surface 190 to the second clutch collar spline tooth end surface 192. In addition, the first clutch collar spline tooth side surface 194 may be disposed in a nonparallel relationship with the axis 80 and the clutch collar center tooth plane 200. The first clutch collar spline tooth side surface 194 may also be disposed substantially parallel to an adjacent side surface of the first spline 82 of the input shaft 54. For instance, the first clutch collar spline tooth side surface 194 may be disposed substantially parallel to the second side surface 96. As is best shown in FIG. 5b, the first clutch collar spline tooth side surface 194 may have a length $L_{C3}$ that may extend from the first clutch collar spline tooth end surface 190 to the second clutch collar spline tooth end surface 192. The length $L_{C1}$ of the first clutch collar spline tooth end surface 190 and the length $L_{C2}$ of the second clutch collar spline tooth end surface 192 may be less than the length $L_{C3}$ of the first clutch collar spline tooth side surface 194.

The second clutch collar spline tooth side surface 196 may be disposed opposite the first clutch collar spline tooth side surface 194 and may extend from the first clutch collar spline tooth end surface 190 to the second clutch collar spline tooth end surface 192. Like the first clutch collar spline tooth side surface 194, the second clutch collar spline tooth side surface 196 may be disposed in a nonparallel relationship with the axis 80 and the clutch collar center tooth plane 200. The second clutch collar spline tooth side surface 196 may also be disposed substantially parallel to an adjacent side surface of the first spline 82 of the input shaft 54. For instance, the second clutch collar spline tooth side surface 196 may be disposed substantially parallel to the first side surface 94. In addition, the second clutch collar spline tooth side surface 196 may be disposed in a nonparallel relationship with the first clutch collar spline tooth side surface 194. The second clutch collar spline tooth side surface 196 may have the same length as the first clutch collar spline tooth side surface 194.

The outer clutch collar spline tooth surface 198 may face toward from the axis 80. The outer clutch collar spline tooth surface 198 may extend from the first clutch collar spline tooth end surface 190 to the second clutch collar spline tooth end surface 192. In addition, the outer clutch collar spline tooth surface 198 may extend from the first clutch collar spline tooth side surface 194 to the second clutch collar spline tooth side surface 196.

Each clutch collar spline tooth 180 may be bisected by a corresponding clutch collar center tooth plane 200. As is best shown in FIG. 5b, the clutch collar center tooth plane 200 may bisect the first clutch collar spline tooth end surface 190 and the second clutch collar spline tooth end surface 192. The clutch collar center tooth plane 200 may extend along the axis 80 and the axis 80 may be completely disposed in the clutch collar center tooth plane 200. The first clutch collar spline tooth side surface 194 and the second clutch collar spline tooth side surface 196 may be disposed closer to the clutch collar center tooth plane 200 at the first clutch collar spline tooth end surface 190 than at the second clutch collar spline tooth end surface 192. In addition, the first clutch collar spline tooth side surface 194 and the second clutch collar spline tooth side surface 196 may be disposed at an angle α with respect to the clutch collar center tooth plane 200. As such, the first clutch collar spline tooth side surface 194 and the second clutch collar spline tooth side surface 196 may be disposed in a nonparallel relationship with the clutch collar center tooth plane 200.

Referring to FIGS. 4 and 5a, the annular groove 168 may be disposed between the first clutch collar face 160 and the second clutch collar face 162. The annular groove 168 may extend toward the axis 80 and may extend continuously around the clutch collar 70. The annular groove 168 may receive a linkage, such as a fork, that may operatively connect the clutch collar 70 to an actuator that may position the clutch collar 70 along the input shaft 54.

Referring to FIGS. 5a, 5b, 6a, and 6b, movement of the clutch collar 70 is shown in more detail. The clutch collar 70 may move between a disengaged position and an engaged position. The clutch collar 70 is shown in an exemplary disengaged position in FIGS. 5a and 5b and is shown in an exemplary engaged position in FIGS. 6a and 6b. In the disengaged position, the clutch collar 70 may be spaced apart from and may not engage the drive gear 56. As such, the clutch collar face gear 170 may not engage and mate with the face gear 112 of the drive gear 56. As a result, the input shaft 54 and the output shaft 60 are free to rotate at different velocities with respect to each other by way of operation of the interaxle differential unit 58. In the engaged position, the clutch collar 70 may engage the drive gear 56. As such, the clutch collar face gear 170 may engage and mesh with the face gear 112 of the drive gear 56. The clutch collar 70 may lock the interaxle differential unit 58 when the clutch collar 70 is in the engaged position such that the input shaft 54 and the output shaft 60 may not rotate at different velocities with respect to each other.

Figure 6A:
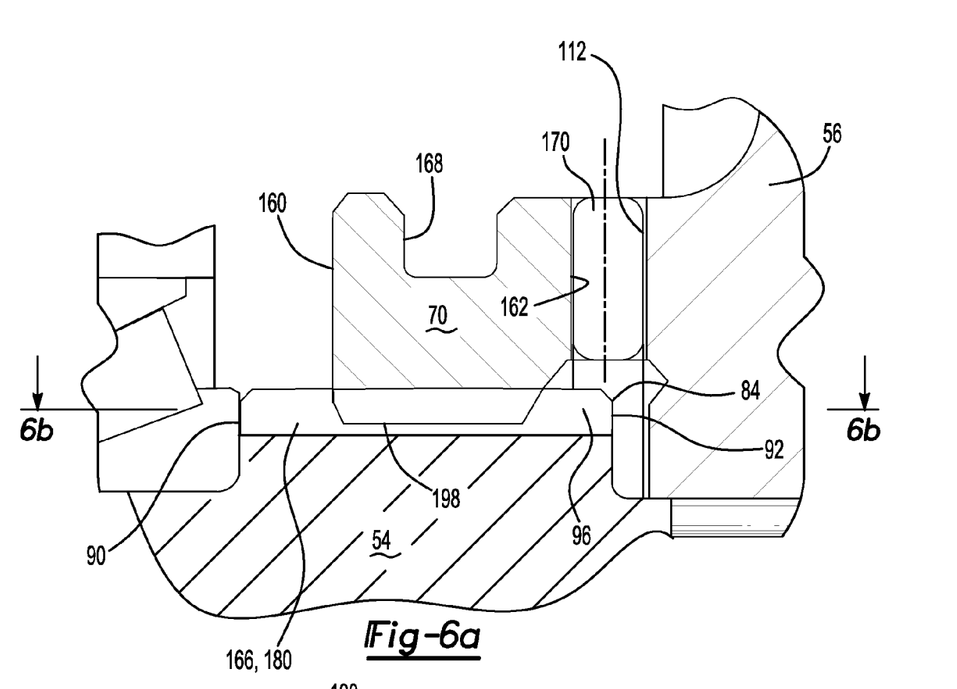
FIG. 6a is a magnified view of a portion of the axle assembly with the clutch collar in an exemplary engaged position.
Figure 6B:
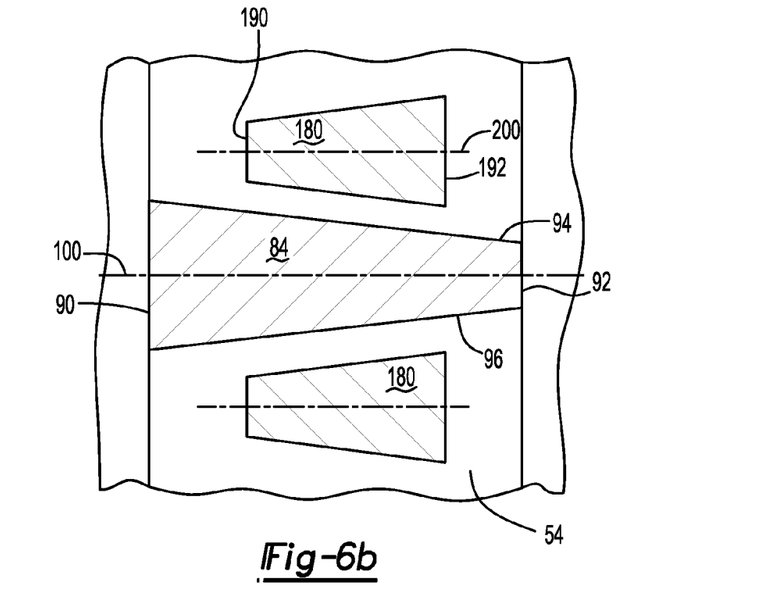
FIG. 6b is a section view along section line 6b-6b.
Figure 6C:
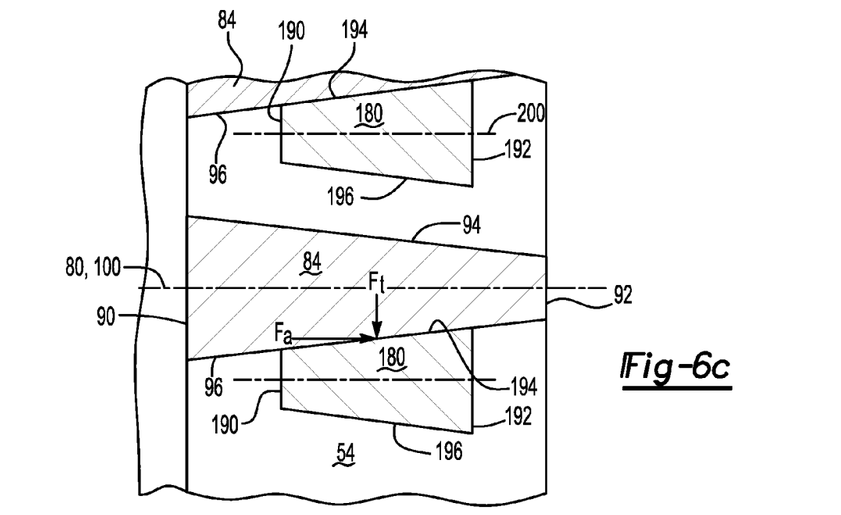
FIG. 6c is a section view in which the shaft is rotated with respect to FIG. 6b.

Referring to FIG. 6c, one or more clutch collar spline teeth 180 may engage a spline tooth 84 of the input shaft 54 when the clutch collar 70 is in the engaged position and the input shaft 54 rotates about the axis 80. For example, each clutch collar spline tooth 180 may engage only one spline tooth 84 of the input shaft 54 when the clutch collar 70 is in the engaged position and the input shaft 54 is rotated about the axis 80 from the position shown in FIG. 6b to the position shown in FIG. 6c. It is noted that the input shaft 54 may rotate in the opposite direction in one or more embodiments, in which case the spline tooth 84 would engage a different adjacent clutch collar spline tooth 180.

As shown in FIG. 6c, the spline tooth 84 of the input shaft 54 may exert force on a clutch collar spline tooth 180 in multiple directions or along different force vectors and/or axes. For instance, the second side surface 96 of a spline tooth 84 may engage the first clutch collar spline tooth side surface 194 and may exert force against the clutch collar spline tooth 180. A portion of the force exerted against the clutch collar spline tooth 180 may be exerted axially or in a direction that may extend substantially parallel to the axis 80 as represented by force vector $F_a$ and a portion of the force may be exerted in a direction that may be disposed perpendicular to force vector $F_a$ as represented by force vector $F_t$. Force vector $F_a$ may extend toward the drive gear 56 and may help hold the clutch collar 70 in the engaged position. As such, force vector $F_a$ may exert force in the first direction or to the right from the perspective shown and may help inhibit movement of the clutch collar 70 in the second direction or to the left from the perspective shown. Force vector $F_t$ may generally extend in a direction of rotation of the input shaft 54 about the axis 80 and may extend toward a clutch collar spline tooth 180 that is engaged by the spline tooth 84 and may represent rotational force that may be exerted by the input shaft 54 on the clutch collar 70 and that may be transmitted to the drive gear 56 to cause the clutch collar 70 and drive gear 56 to rotate with the input shaft 54.

Figure 7:
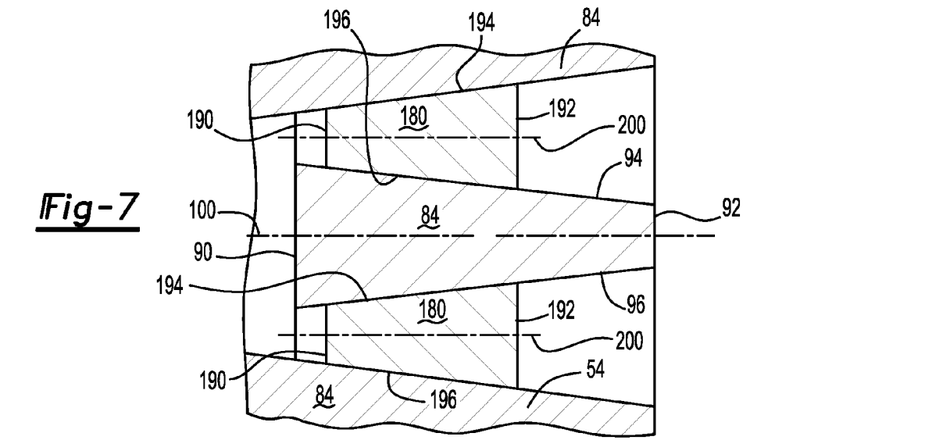
FIG. 7 is a section view of a tapered spline arrangement that limits movement of the clutch collar.

Referring to FIG. 7, another embodiment of a tapered spline arrangement is shown. In this embodiment, movement of the clutch collar 70 in the second direction or to the left from the perspective shown may be limited by the first spline 82 of the input shaft 54. More specifically, the clutch collar 70 may be inhibited from moving in the second direction when two clutch collar spline teeth 180 engage a common spline tooth 84 of the input shaft 54. For example, a first clutch collar spline tooth 180 may engage the first side surface 94 of the spline tooth 84 and a second clutch collar spline tooth 180 may engage the second side surface 96 of the same spline tooth 84.

Figure 8A:
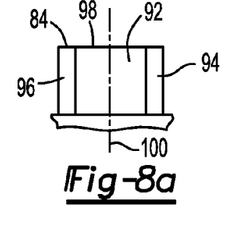
FIGS. 8a-8c are end views of exemplary spline teeth configurations.
Figure 8B:
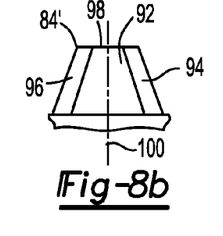
Figure 8C:
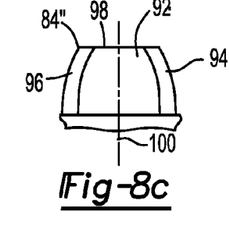

Referring to FIGS. 8a-8c, and the views of various spline tooth profiles are shown. The spline tooth profiles are illustrated with respect to the first spline 82 of the input shaft 54; however, it is to be understood that these spline tooth profiles may be provided with the spline teeth of the clutch collar 70. The spline tooth profiles in FIGS. 8a-8c are shown in a direction that faces toward the narrow end of a spline tooth, such as facing toward the second end surface 92.

Referring to FIG. 8a, the spline tooth 84 is shown having a first side surface 94 and a second side surface 96 that may be substantially planar and may be disposed substantially parallel to each other. In addition, the first side surface 94 and/or the second side surface 96 may be disposed substantially parallel to the center tooth plane 100 at one or more cross-sectional positions. For example, the first side surface 94 and the second side surface 96 may be disposed substantially parallel to the center tooth plane 100 at the first end surface 90, the second end surface 92, and/or cross-sectional positions perpendicular to the axis 80 between the first end surface 90 and the second end surface 92.

Referring to FIG. 8b, a spline tooth 84' is shown that is tapered with respect to the center tooth plane 100. For example, spline tooth 84' may be tapered such that the distance between the first side surface 94 and the second side surface 96 may increase in a direction that extends from the outer surface 98 toward the axis 80, or downward from the perspective shown. The first side surface 94 and the second side surface 96 may be substantially planar.

Referring to FIG. 8c, a spline tooth 84" is shown having an involute configuration. More specifically, the first side surface 94 and the second side surface 96 may each be provided with an involute profile as is known by those skilled in the art.

The tapered spline tooth arrangements described above may help inhibit disengagement of face gears due to axial force (e.g., $F_a$) that may inhibit movement of the clutch collar from an engaged position to a disengaged position when torque is applied. As a result, the tapered spline teeth and associated force vectors may allow the face gear teeth to be provided without negative pressure angles that may otherwise be provided to help inhibit disengagement of face gear teeth. Providing gear teeth with negative pressure angles may increase cost and manufacturing time of the gear teeth since special machines, such as five axis CNC machines, and special cutting tools may be needed cut the negative pressure angle geometry. Providing face gear teeth without negative pressure angles may allow face gear teeth to be manufactured using less expensive three axis CNC machines or by precision forging that may not require additional machining, either of which may reduce associated costs. In addition, providing face gear teeth without negative pressure angles may allow face gear teeth to be provided without undercut faces and may improve the strength and durability of the face gear teeth.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a first shaft that extends along an axis and that has a first spline, wherein the first spline has a first spline tooth that is tapered in a first direction that extends substantially parallel to the axis; and
a clutch collar that is moveably disposed on the first shaft, the clutch collar having a hole that receives the first shaft and a clutch collar spline that is disposed in the hole, wherein the clutch collar spline has a clutch collar spline tooth that is tapered in a second direction that extends opposite the first direction wherein the clutch collar spline tooth includes:
a first clutch collar spline tooth end surface;
a second clutch collar spline tooth end surface that is disposed opposite the first clutch collar spline tooth end surface and is disposed substantially parallel to the first clutch collar spline tooth end surface; and
first and second clutch collar spline tooth side surfaces that extend from the first clutch collar spline tooth end surface to the second clutch collar spline tooth end surface, the second clutch collar spline tooth side surface being disposed in a nonparallel relationship with the first clutch collar spline tooth side surface.

2. The axle assembly of claim 1 wherein the clutch collar includes a first clutch collar face and a second clutch collar face that is disposed opposite the first clutch collar face, wherein the hole extends between the first clutch collar face and the second clutch collar face and clutch collar spline tooth extends between the first clutch collar face and the second clutch collar face.

3. The axle assembly of claim 2 further comprising a drive gear that is rotatably disposed on the first shaft and that has a face gear that faces toward the clutch collar, and wherein the clutch collar further comprises a clutch collar face gear that extends from the second clutch collar face, wherein the clutch collar face gear meshes with the face gear when the clutch collar moves in the first direction to an engaged position.

4. The axle assembly of claim 3 wherein teeth of the face gear and teeth of the clutch collar face gear are provided without a negative pressure angle.

5. The axle assembly of claim 3 further comprising an interaxle differential unit that is disposed on the first shaft adjacent to the drive gear and a second shaft that is coupled to the interaxle differential unit, wherein the clutch collar locks the interaxle differential unit when the clutch collar is in the engaged position such that the first shaft and second shaft rotate at a common rotational velocity about the axis.

6. The axle assembly of claim 3 wherein the clutch collar spline tooth engages the first spline tooth when the clutch collar is in the engaged position and the first shaft rotates about the axis.

7. The axle assembly of claim 1 wherein the first spline tooth exerts force in the first direction against the clutch collar spline tooth to inhibit movement of the clutch collar in the second direction.

8. The axle assembly of claim 1 wherein the clutch collar spline has a second clutch collar spline tooth, wherein the clutch collar is inhibited from moving in the second direction when the clutch collar spline tooth and the second clutch collar spline tooth engage the first spline tooth.

9. An axle assembly comprising:
a first shaft that extends along an axis and that has a first spline that includes a first set of spline teeth that are arranged around the axis, wherein each member of the first set of spline teeth includes:
a first end surface that extends away from the axis;
a second end surface that extends away from the axis and is disposed opposite the first end surface;
a first side surface that extends from the first end surface to the second end surface; and
a second side surface that is disposed opposite the first side surface, wherein the second side surface extends from the first end surface to the second end surface and is disposed in a nonparallel relationship with the first side surface;
wherein the first end surface and the second end surface are disposed substantially perpendicular to the axis, the first end surface is disposed substantially parallel to the second end surface, and a length of the first end surface from the first side surface to the second side surface is greater than a length of the second end surface from the first side surface to the second side surface; and
a clutch collar that is moveably disposed on the first shaft, wherein the clutch collar has a hole through which the first shaft extends and a set of clutch collar spline teeth that receive the first set of spline teeth.

10. The axle assembly of claim 9 wherein the length of the first end surface is less than a length of the first side surface from the first end surface to the second end surface.

11. The axle assembly of claim 9 wherein a center tooth plane bisects the first end surface and the second end surface such that the axis is completely disposed in the center tooth plane and the first side surface and the second side surface are disposed closer to the center tooth plane at the second end surface than at the first end surface.

12. The axle assembly of claim 11 wherein the first side surface and the second side surface are disposed substantially parallel to the center tooth plane at the second end surface.

13. The axle assembly of claim 11 wherein each member of the first set of spline teeth has an outer surface that extends from the first end surface to the second end surface and from the first side surface to the second side surface, wherein a distance between the first side surface and the second side surface increases in a direction that extends from the outer surface toward the axis.

14. The axle assembly of claim 11 wherein each member of the first set of spline teeth has an involute configuration.

15. The axle assembly of claim 9 wherein each member of the set of clutch collar spline teeth includes:
a first clutch collar spline tooth end surface that extends toward the axis;
a second clutch collar spline tooth end surface that extends toward the axis and is disposed opposite the first clutch collar spline tooth end surface;
a first clutch collar spline tooth side surface that extends from the first clutch collar spline tooth end surface to the second clutch collar spline tooth end surface; and
a second clutch collar spline tooth side surface that is disposed opposite the first clutch collar spline tooth side surface, wherein the second clutch collar spline tooth side surface extends from the first clutch collar spline tooth end surface to the second clutch collar spline tooth end surface and is disposed in a nonparallel relationship with the first clutch collar spline tooth side surface.

16. The axle assembly of claim 15 wherein a length of the first clutch collar spline tooth end surface from the first clutch collar spline tooth side surface to the second clutch collar spline tooth side surface is less than a length of the second clutch collar spline tooth end surface from the first clutch collar spline tooth side surface to the second clutch collar spline tooth side surface.

17. The axle assembly of claim 15 wherein the first clutch collar spline tooth end surface is disposed substantially parallel to the second clutch collar spline tooth end surface.

18. The axle assembly of claim 15 wherein a clutch collar center tooth plane bisects the first clutch collar spline tooth end surface and the second clutch collar spline tooth end surface such that the axis is completely disposed in the clutch collar center tooth plane and the first clutch collar spline tooth side surface and the second clutch collar spline tooth side surface are disposed closer to the clutch collar center tooth plane at the first clutch collar spline tooth end surface than at the second clutch collar spline tooth end surface.

19. The axle assembly of claim 18 wherein the first clutch collar spline tooth side surface and the second clutch collar spline tooth side surface are disposed in a nonparallel relationship with the clutch collar center tooth plane.

\* \* \* \* \*